United States Patent [19]

Midolo

[11] 4,130,187
[45] Dec. 19, 1978

[54] SYSTEM FOR THERMAL ISOLATING OF BRAKES

[76] Inventor: Lawrence L. Midolo, 1475 Black Oak Dr., Centerville, Ohio 45459

[21] Appl. No.: 837,136

[22] Filed: Sep. 28, 1977

[51] Int. Cl.² ........................................ F16D 65/853
[52] U.S. Cl. .............................. 188/264 CC; 188/71.6
[58] Field of Search .................... 165/105; 188/264 D, 188/264 F, 264 CC, 71.6

[56] References Cited

U.S. PATENT DOCUMENTS

| | | | |
|---|---|---|---|
| 2,407,197 | 9/1946 | Watts | 188/264 CC |
| 3,208,559 | 9/1965 | Chambers et al. | 188/264 CC X |
| 3,651,895 | 3/1972 | Whitfield | 188/264 CC X |
| 3,677,337 | 7/1972 | Midolo | 165/105 |

FOREIGN PATENT DOCUMENTS

1413520  11/1975  United Kingdom .............. 188/264 CC

*Primary Examiner*—Duane A. Reger
*Attorney, Agent, or Firm*—Joseph E. Rusz; Richard J. Killoren

[57] ABSTRACT

A system for protecting aircraft tires and axle bearings from excessive heat developed in the braking system, having a plurality of osmotic heat transfer devices having the cooling fluid pumped from the cold end, which is cooled by radiation fins, to the hot end, within the brake disk locking keys, by osmotic pumping across a membrane. The working fluid can use water as the solvent and the solute is one of the chlorides of sodium or potassium or one of the chlorates of cessium, sodium or calcium.

4 Claims, 5 Drawing Figures

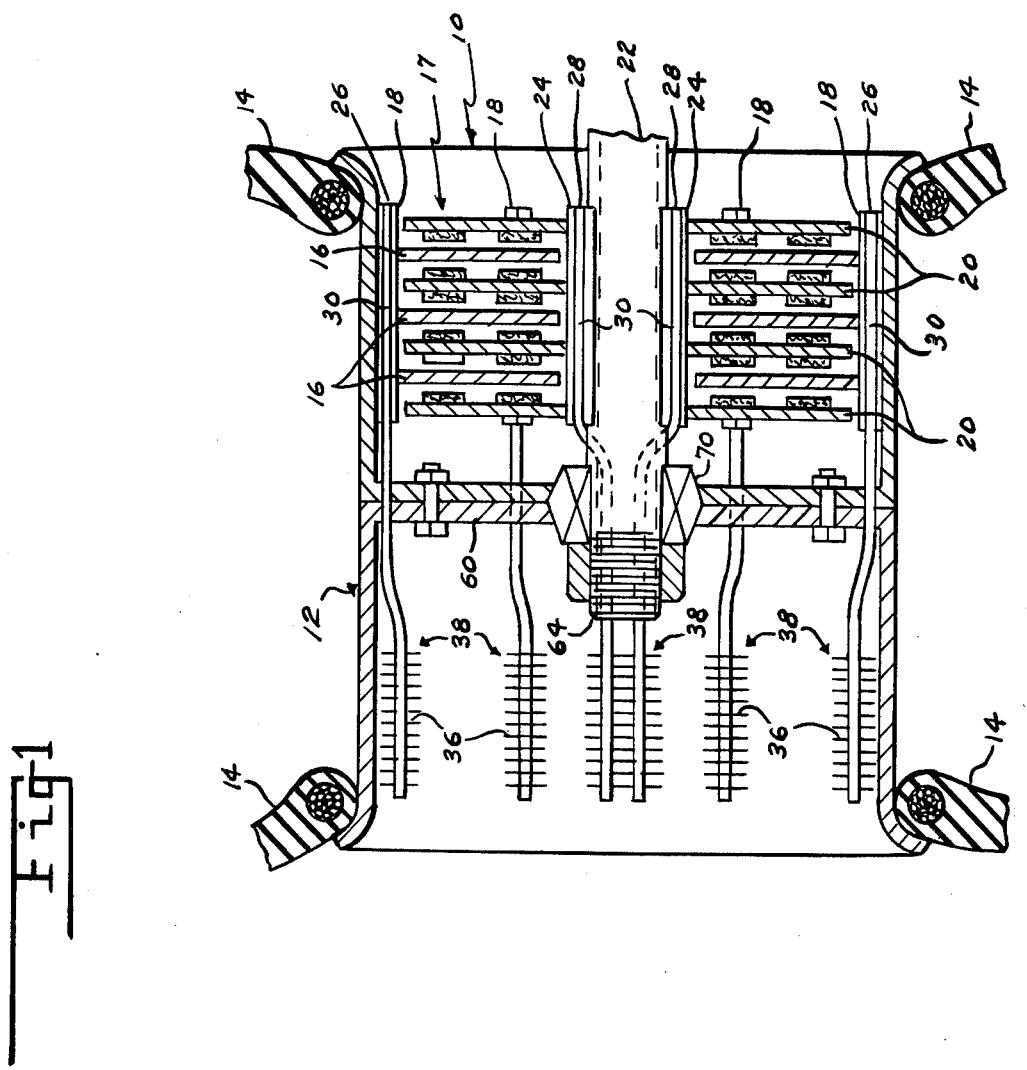

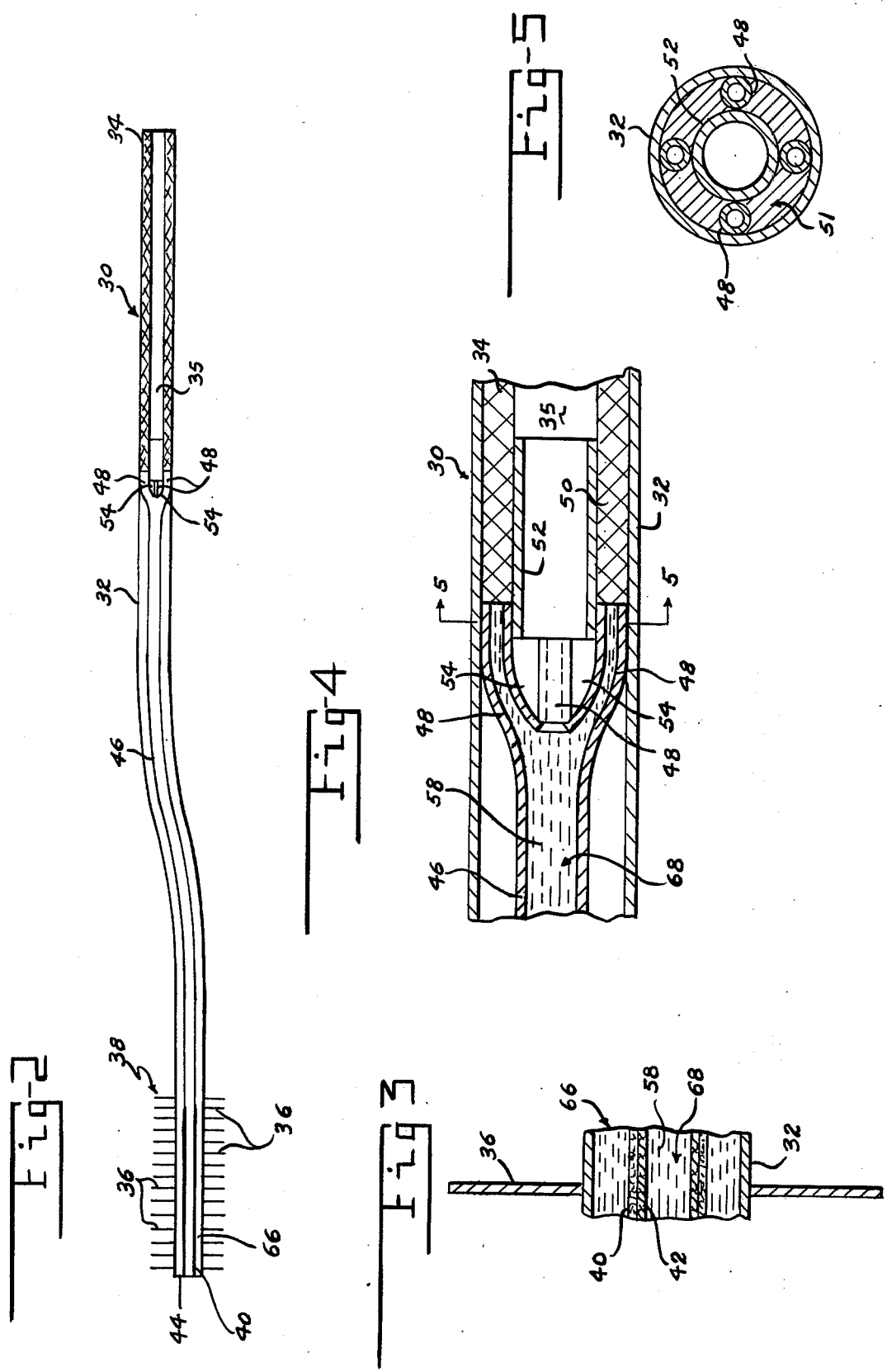

SYSTEM FOR THERMAL ISOLATING OF BRAKES

RIGHTS OF THE GOVERNMENT

The invention described herein may be manufactured and used by or for the Government of the United States for all governmental purposes without the payment of any royalty.

BACKGROUND OF THE INVENTION

This invention relates to a system for protecting aircraft wheel bearings and tires from excessive heat developed in the braking system.

Various systems have been used in the transfer of heat in rotating apparatus. The patents of Fries, U.S. Pat. No. 3,765,480, and Gray, U.S. Pat. No. 3,842,596, disclose two such systems.

Some tire failures on aircraft are due to the high temperatures developed in braking being conducted to the wheel rim and to the tire. Since aircraft brakes consist of a plurality of rotor and stator brake plates keyed to the wheel and the axle, it is very difficult to provide good heat transfer from the brake assembly. Also since heat transfer continues after the wheel stops rolling, some system for protecting the tire is needed which does not depend upon centrifugal pumping.

BRIEF SUMMARY OF THE INVENTION

According to this invention, a cold barrier is provided in the heat flow path between the braking system and the tire, and the braking system and the axle, to prevent bearing damage, in an aircraft wheel. An osmotic pumping system, such as described in applicant's patent "Heat Transfer Apparatus With Osmotic Pumping", 3,677,337, is adapted for use in a heat transfer system for removing heat from the keys which hold the rotor and stator brake plates.

IN THE DRAWINGS

FIG. 1 is a partially schematic sectional view of an aircraft wheel and brake assembly according to the invention.

FIG. 2 is an enlarged schematic view of one of the heat transfer elements used in the device of FIG. 1.

FIG. 3 is an enlarged cut away view of a portion of the cold end osmotic pumping system for the device of FIG. 2.

FIG. 4 is an enlarged cut away view of a portion of hot end evaporator section for the device of FIG. 1.

FIG. 5 is a sectional view of the device of FIG. 4 along the line 5—5.

DETAILED DESCRIPTION OF THE INVENTION

Reference is now made to FIG. 1 of the drawing which shows an aircraft wheel 10 having a two part rim assembly 12, for holding a tire 14. A plurality of brake rotor plates 16, of a braking system 17, are keyed to the rim assembly 12 by means of keys 18. A plurality of brake stator blades 20 are keyed to the axle 22 by means of keys 24. The keys 18 and 24 are made larger than normal to permit the drilling of longitudinal chambers for holding osmotic heat transfer elements 26 and 28 while still maintaining the proper strength.

The osmotic heat transfer elements 26 and 28, shown in greater detail in FIGS. 2-5, have their hot ends 30 fitting into the longitudinal chambers in keys 18 and 24. The hot ends of the heat transfer elements are substantially the same as the hot ends of the device shown in FIGS. 6 and 7 of U.S. Pat. No. 3,677,337.

Each of the heat transfer elements has a sealed tubular chamber with an outer wall 32 of a material such as stainless steel. A wick 34 of a material, such as stainless steel mesh, glass beads or a flame sprayed porous metal oxides, is positioned adjacent wall 32 at the hot end 30 of the heat transfer elements and forms a chamber 35 within the wick. Since temperature levels between 400° to 500° Fahrenheit are encountered, cotton felt or rayon cloth wicks cannot be used.

Radiation fins 36 of a material such as aluminum are secured to the cold end 38 of the heat transfer elements. A tubular osmotic membrane 40 is supported by a support member 42 made of a material such as porous stainless steel or sintered bronze. The osmotic membrane used must be capable of withstanding the high temperatures encountered in the systems. Membranes that could be used are the high temperature cellulose ascetate membranes, polyfurfuryl membranes, polysulfone alcohol membranes, fluorcarbon membranes, cuprophane membranes or dynamically formed membranes on ceramic or sintered substrates developed by Clemson University. The membrane 40 is sealed to end wall 44 and to a tubular member 46. The tubular member 46 carries the return fluid to the hot end 30. The tube 46 divides into four tubes 48 leading to an annular channel 50 formed by wall 32 and an inner wall 52. The tubes 48 extend into a sealing member 51, between walls 32 and 52. The wick 34 extends into the channel 50 adjacent the ends of tubes 48. The tube 46 and tubes 48 form a liquid transfer passage between membrane 40 and the wick 34. Passages 54 are provided between tubes 48 to form a path for the vapors from chamber 35 at the hot end 30 to the cold end 38 of the heat transfer elements.

The working fluid 58 within the membrane 40, tubular member 46 and wick 34 consists of water as a solvent with the solute being a chloride of sodium or potassium or a chlorate of cesium, sodium, potassium or calcium.

The heat transfer elements 26 pass through the wheel rim webbing 60 to the cold end 38. The heat transfer elements 28 pass through openings in the hollow axle 22 and pass out through the end 64 of the axle to the cold ends 38. Common cooling fins 36' are provided at the cold ends 38 of heat transfer elements 28. Though not shown, common annular fins could be used with all of the elements 26 which would interconnect the ends 38 of all of the heat transfer elements 26.

In the operation of the device of the invention, heat from the braking system 17, heat the hot ends 30 of the heat transfer elements 26 and 28. This heat at the wall 32 adjacent the wick 34 causes the water to evaporate within the wick 34 and enter the chamber 35. The vapor passes through passages 54 to the cold end 38 of the heat transfer elements. The vapor is condensed on the wall 32 adjacent the radiation fins 36. The condensed vapor collects in space 66 between wall 32 and the membrane 40 and is returned to space 68 and wick 34 by osmotic diffusion pumping as described in U.S. Pat. No. 3,677,337. The removal of heat from keys 18 and 24 provides a cold barrier in the heat flow paths between the braking system 17 and the tire 14 and the braking system and the axle 22 and bearing 70.

There is thus provided a system for providing cold barriers between the braking system and the tire and the braking system and the axle of an aircraft wheel, which does not depend upon rotation or positioning of the wheel.

I claim:

1. An apparatus for thermally isolating the brakes from the tire and axle bearing in an aircraft wheel having an axle member, a rim member, a brake member, with the brake member having rotor members and stator members; a plurality of key members for securing the brake rotor members to the rim member and the stator members to the axle member; comprising: a plurality of elongated heat transfer members; each of said heat transfer members having a sealed tubular chamber; a heat resistant wick member adjacent the wall at one end of the heat transfer member; means, at the end of said chamber remote from said wick member for removing heat from said chamber; a solution within said chamber; a tubular membrane, permeable only to the solvent, of said solution, supported within said chamber at the end of the chamber adjacent the heat removing means; said tubular membrane being spaced from the wall of the tubular chamber; a liquid transfer passage connected between the tubular membrane and the wick member; a solvent vapor transfer passage between said wick member and the space between the tubular member and the tubular membrane; said key members each having a longitudinal chamber therein; each of said elongated heat transfer members having its wick end extending into said longitudinal chambers in said key members; the end of said elongated heat transfer member having said heat removing means being positioned on the side of said aircraft wheel remote from said brake member.

2. The device as recited in claim 1 wherein said means for removing heat from the heat transfer member includes a plurality of heat radiating fins secured to the tubular chambers.

3. The device as recited in claim 2 wherein said permeable tubular membrane is supported on a sintered bronze support tube.

4. The device as recited in claim 2 wherein said permeable tubular membrane is supported on a porous stainless steel support tube.

* * * * *